(12) United States Patent
Karschnia

(10) Patent No.: US 8,005,020 B2
(45) Date of Patent: Aug. 23, 2011

(54) WIRELESS MESH NETWORK WITH MULTISIZED TIMESLOTS FOR TDMA COMMUNICATION

(75) Inventor: Robert J. Karschnia, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 825 days.

(21) Appl. No.: 11/906,163

(22) Filed: Sep. 28, 2007

(65) Prior Publication Data

US 2008/0084852 A1   Apr. 10, 2008

Related U.S. Application Data

(60) Provisional application No. 60/848,606, filed on Sep. 29, 2006.

(51) Int. Cl.
| | |
|---|---|
| G01R 31/08 | (2006.01) |
| H04B 7/00 | (2006.01) |
| H04B 7/212 | (2006.01) |
| H04J 3/06 | (2006.01) |

(52) U.S. Cl. ........ 370/255; 370/310; 370/321; 370/322; 370/324; 370/337; 370/347; 370/348; 370/350; 370/442; 370/443; 370/458; 370/503

(58) Field of Classification Search .................. None
See application file for complete search history.

(56) References Cited

U.S. PATENT DOCUMENTS

| | | | |
|---|---|---|---|
| 5,359,320 A | 10/1994 | Jaffe et al. | |
| 5,560,021 A | 9/1996 | Vook et al. | |
| 5,862,391 A | 1/1999 | Salas et al. | |
| 6,301,527 B1 | 10/2001 | Butland et al. | |
| 6,374,311 B1 | 4/2002 | Mahany et al. | |
| 6,567,389 B1 * | 5/2003 | Honkasalo et al. | 370/342 |
| 6,731,946 B1 | 5/2004 | Stanwood et al. | |
| 6,775,276 B1 | 8/2004 | Beser | |
| 6,859,831 B1 | 2/2005 | Gelvin et al. | |
| 2002/0027896 A1 | 3/2002 | Hughes et al. | |
| 2002/0042274 A1 * | 4/2002 | Ades | 455/445 |
| 2002/0065631 A1 | 5/2002 | Loechner | |
| 2004/0001084 A1 | 1/2004 | Shrinidhi et al. | |
| 2004/0032853 A1 | 2/2004 | D'Amico et al. | |
| 2004/0259555 A1 | 12/2004 | Rappaport et al. | |
| 2005/0030968 A1 * | 2/2005 | Rich et al. | 370/449 |
| 2005/0119001 A1 | 6/2005 | Watanabe | |
| 2005/0122929 A1 | 6/2005 | Zuniga | |

(Continued)

FOREIGN PATENT DOCUMENTS

WO   WO 03/023536   3/2003

OTHER PUBLICATIONS

International Search Report and Written Report for PCT/US07/20908.

*Primary Examiner* — Seema S. Rao
*Assistant Examiner* — Christine Duong
(74) *Attorney, Agent, or Firm* — Kinney & Lange, P.A.

(57) ABSTRACT

A wireless mesh network uses communication frames that can include timeslots of different sizes depending on communication speed capabilities of the devices assigned to the timeslots. The communication frame is divided into timeslot increments of equal length. The timeslots are made up of one or more timeslot increments.

16 Claims, 2 Drawing Sheets

U.S. PATENT DOCUMENTS

| | | |
|---|---|---|
| 2005/0149940 A1 | 7/2005 | Calinescu et al. |
| 2005/0164684 A1 | 7/2005 | Chen et al. |
| 2005/0192727 A1 | 9/2005 | Shostak et al. |
| 2005/0201340 A1 | 9/2005 | Wang et al. |
| 2005/0201349 A1 | 9/2005 | Budampati |
| 2005/0238058 A1 | 10/2005 | Pierce, Jr. et al. |
| 2005/0281215 A1 | 12/2005 | Budampati et al. |
| 2005/0282494 A1 | 12/2005 | Kossi et al. |
| 2006/0002368 A1 | 1/2006 | Budampati et al. |
| 2006/0029061 A1 | 2/2006 | Pister et al. |
| 2006/0203795 A1* | 9/2006 | Welborn et al. ............... 370/345 |
| 2006/0227729 A1 | 10/2006 | Budampati et al. |
| 2006/0239333 A1* | 10/2006 | Albert et al. .................. 375/130 |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |
| 2008/0130615 A1 | 6/2008 | Kashiwagi et al. |

* cited by examiner

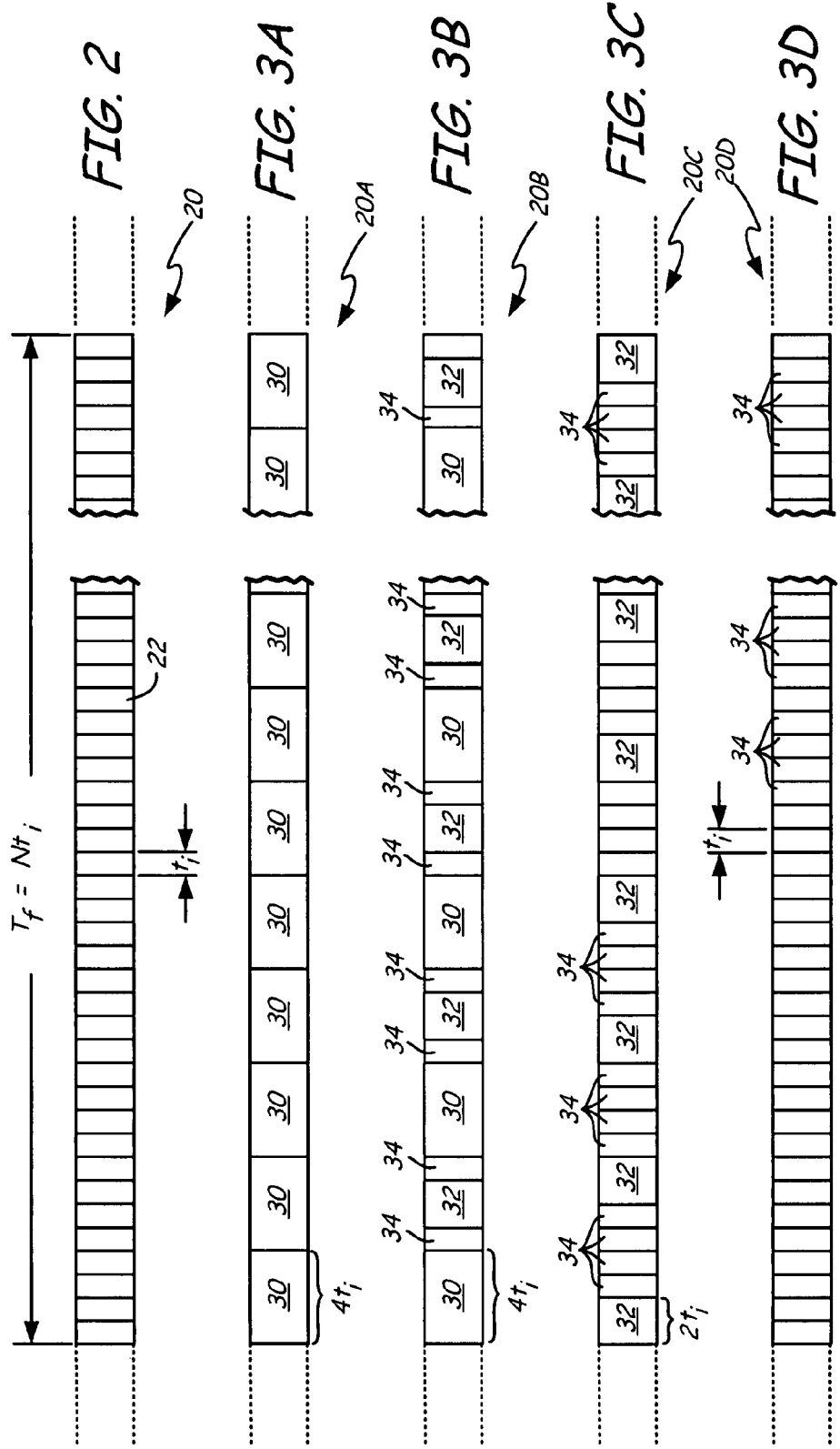

WIRELESS MESH NETWORK WITH MULTISIZED TIMESLOTS FOR TDMA COMMUNICATION

CROSS-REFERENCE TO RELATED APPLICATION

This application claims priority from provisional application Ser. No. 60/848,606 filed Sep. 29, 2006, which is incorporated by reference.

BACKGROUND OF THE INVENTION

The present invention relates to devices that communicate over a wireless mesh network using a Time Division Multiple Access (TDMA) communication protocol. In particular, the present invention relates to a wireless mesh network using multisized timeslots for communication among devices having different communication speed capabilities.

Wireless data communication and control will be a dominant player in future sensor automation, process control, security, and safety regulation. One of the important requirements for wireless data communication and control is minimized power consumption by the devices communicating over the network.

In wireless mesh network systems designed for low power, sensor/actuator-based applications, many devices in the network must be powered by long-life batteries or by low power energy-scavenging power sources. Power outlets, such as 120VAC utilities, are typically not located nearby or may not be allowed into the hazardous areas where the instrumentation (sensors) and actuators must be located without incurring great installation expense. The need for low installation cost drives the need for battery-powered devices communicating as part of a wireless mesh network. Effective utilization of a limited power source, such as a primary cell battery which cannot be recharged, is vital for a well functioning wireless device. Batteries are expected to last more than 5 years and preferably as long as the life of the product.

In a true wireless mesh network, which may also be referred to as a self-organizing multi-hop network, each device (or node) must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast a point-to-point system, which employs remote devices talking directly to a centralized base-station.

A mesh network protocol allows for the formation of alternate paths for messaging between devices and messaging between the devices and a data collector, bridge or gateway to some higher level higher-speed data bus. Having alternate, redundant paths for wireless messages enhances data reliability by ensuring there is at least one alternate path for messages to flow even if another path is blocked or degrades due to environmental influences or interference.

Some mesh network protocols are deterministically routed such that every device has an assigned parent and at least one alternate parent. In the hierarchy of the mesh network, much as in a human family, parents have children, children have grandchildren, and so on. Each device (or node) relays the messages for its descendants through the network to some final destination such as a gateway. The parenting nodes may be battery-powered or limited-energy powered devices. The more descendants a node has, the more traffic it must route, which in turn directly increases its own power consumption and diminishes its battery life.

In order to save power, some protocols limit the amount of traffic any node can handle during any period of time by only turning on the radios of the nodes for limited amounts of time to listen for messages. Thus, to reduce average power, the protocol may allow duty-cycling of the radios between On and Off states. Some protocols use a global duty cycle to save power such that the entire network is On and Off at the same time. Other protocols (e.g. TDMA-based) use a local duty cycle where only the communicating pair of nodes that are linked together are scheduled to turn On and Off in a synchronized fashion at predetermined times. Typically, the link is pre-determined by assigning the pair of nodes a specific timeslot for communications, assigning an RF frequency channel to be used by the radios, and designating who is to be receiving (Rx), and who is to be transmitting (Tx) at that timeslot.

When a new device joins the network, a network manager provides the new device with a schedule which the new device will use to talk to other devices in the network. Each device in the network is provided with timeslots (specific times and radio frequencies) for passing data to or from one or more "children" and one or more "parents". Using different times and frequencies allows many devices to pass messages in the same space without collisions. Frequency hopping also helps to secure the data that is being passed in the network. Secured self-organizing networks frequently employ authentication and encryption to further protect the network.

In a TDMA network, a timeslot represents a communication window. A series of timeslots make up a frame, which is a repeating unit of time that defines a refresh rate of the network.

A typical TDMA based wireless mesh network breaks the frame into equal duration timeslots. Each slot is then scheduled to support communication from one device to another. Timeslots are defined as the minimum amount of time needed to turn on the radio, verify the channel is clear (listen), send the message, and listen for an acknowledgement. Radios must switch between receive-transmit-receive during this process and this turnaround time is a factor in the minimum slot time, as is the packet size of the message being sent.

Several performance enhancements to wireless mesh networks will occur over time as silicon radios get better, e.g. faster turn around time, higher speeds of communication, compression of data, less clock drift, etc. All of these enhancements and many more will lead to smaller and smaller timeslots. Forward compatibility of wireless mesh networks will become an issue as new devices joining a network will have communication speed capabilities that are much greater than other devices in the network.

BRIEF SUMMARY

A wireless mesh network capable of accommodating devices (or nodes) having different communication speed capabilities uses frames that can contain timeslots of different sizes. The frames are divided into timeslot increments of equal length, and each timeslot is made up of one or more timeslot increments. The number of increments making up a timeslot is based upon the communication speed capabilities of the devices assigned to that timeslot.

BRIEF DESCRIPTION OF THE DRAWINGS

FIG. 2 is a diagram showing a frame divided into N equal sized timeslot increments.

FIGS. 3A-3D illustrate frames containing timeslots of different lengths that are formed by one or more timeslot increments.

DETAILED DESCRIPTION

Figure 1:
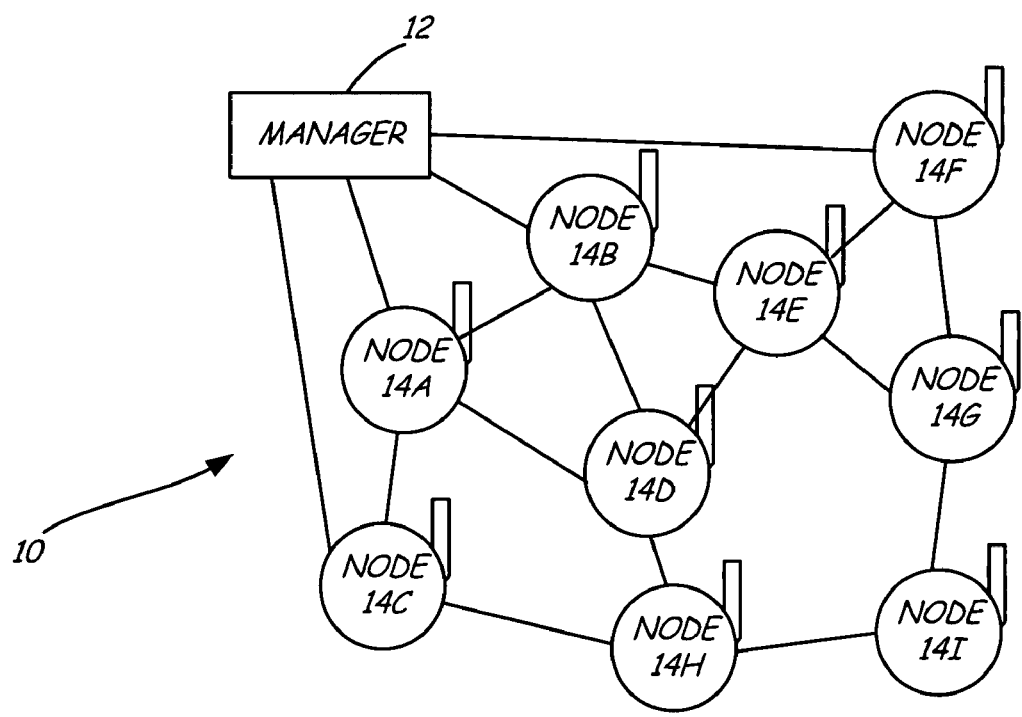
FIG. 1 is a diagram illustrating a wireless mesh network.

FIG. 1 shows self-organizing mesh network 10, which includes network manager 12 and individual devices or nodes 14A-14I. Self-organizing mesh network 10 is a wireless communications network in which individual nodes 14A-14I pass data through multiple paths.

Network manager 12 may comprise, for example, a software application running on a network gateway or on a host computer. Network manager 12 can communicate directly (a single hop) with some of the node (in this case nodes 14A, 14B, 14C, and 14F) and can communicate indirectly (multiple hops) with the remaining devices.

When each of the nodes 14A-14I joined network 10, network manager 12 provided that node with a schedule to use in talking to other nodes within network 10. Each node is provided with timeslots representing specific times and radio frequencies which they use to pass data to and from nearby devices that are either children or parents of that node.

In one embodiment, nodes 14A-14I are field devices in a distributed industrial process system. The field devices may be transmitters having a sensor (or sensors) to monitor a process parameter such as pressure, temperature, flow rate, or fluid level. Alternatively, the field device may include an actuator for providing the control function in response to a control command signal received over network 10.

In an embodiment of the invention, the specific timeslot assigned to a pair of nodes for communication is selected by work manager 12 based upon the minimum amount of time that each of the nodes will need to turn on the radio, verify the channel is clear, send a message, and listen for an acknowledgement. Different nodes may have different minimum time requirements, particularly when some of the nodes use newer and faster components and circuitry.

Network manager 12 has stored configuration data for each of the nodes, including information that indicates the minimum time period required for that node to communicate during a timeslot. Based on upon that stored information for each of the nodes that will be communicating during a particular timeslot, network manager 12 determines what the duration of the timeslot should be for that particular pair of nodes. If network 10 includes nodes having different communication speeds that require different timeslot durations, each frame of the TDMA cycle may contain timeslots of several different durations.

The ability to accommodate timeslots of different durations within network 10 can be achieved by dividing the frame into a series of equal length slot increments that are as small as or smaller than the shortest expected timeslot to be used by network 10. FIG. 2 shows frame 20, which has been divided into a series of slot increments 22 that are equal length. In the example shown in FIG. 2, frame 20 has a frame length or time $T_f$ that defines the refresh rate of network 10. Each slot increment has a time $t_i$. There are N total slot increments 22 in frame 20. Therefore, the frame time $T_f = Nt_i$ and the time duration of the timeslots is $Mt_i$, where M is a positive integer and is less than N.

FIGS. 3A-3D illustrate examples of frames containing different combinations of timeslots. In FIG. 3A, frame 20A is made up of timeslots 30 that are of equal length. Each timeslot 30 is made up of four slot increments. Therefore, the length or time duration of each timeslot in frame 20A is 4 $t_i$.

FIG. 3B shows frame 20B, which illustrates a frame made up of timeslots of three different durations. Timeslots 30 are made up of four timeslot increments. Timeslots 32 are made up of two timeslot increments, and timeslots 34 are made up of a single time increment. In the examples shown in FIG. 3B, nodes of different communication speeds are accommodated by timeslots having lengths of $t_i$, 2 $t_i$, and 4 $t_i$. Timeslots 30 are four times as long as timeslots 34. As a result, nodes having a wide range of speeds can be accommodated on network 10. In addition, since some nodes are able to communicate with one another at much higher speeds, a larger number of timeslots can be accommodated in frame 20B than is possible than in frame 20A (where all timeslots 30 are of length 4 $t_i$).

FIG. 3C shows frame 20C, which has a mixture of timeslots 32 and 34. Frame 20C is used where all of the nodes are capable of operating at either the highest speed (represented by timeslots 34) or at half that speed (as represented by timeslots 32).

FIG. 3D shows frame 20D, containing only timeslots 34, which correspond to a single slot increment. Frame 20D is used when all nodes on network 10 are capable of operating at the highest possible communication speed.

FIGS. 3A-3D show a sample of the variety of different timeslot allocations that can be made. By allowing timeslots of varying length, network 10 can provide as many timeslots during a frame as are consistent with the communication capabilities of the individual nodes in network 10. The timeslots are not limited by the minimum time required by the slowest node within network 10. Rather, those nodes that can communicate with one another in shorter timeslots are allowed to do so, which allows a larger number of timeslots depending upon how many nodes can operate at the higher speeds.

Depending upon the physical location of the nodes, it is possible that a node may use a timeslot of longer duration (for example timeslot 30) to communicate with a parent or child node that can only operate at the slower communication rate, and still communicate with another node (a parent or child) capable of higher speed communication with a shorter a shorter timeslot 32 or 34. Thus, the duration of all of the timeslots, and thus the total number of timeslots available in frame 20, is not dictated by the slowest node within network 10.

By using variable duration timeslots, both fast and slow nodes can be accommodated within a single wireless mesh network. This provides great flexibility as wireless devices continue to evolve. By using small slot increments to equally divide the frame, and then determining timeslot duration based on one or more slot increments, flexibility in network design and forward compatibility with new faster devices is achieved.

Although the present invention has been described with reference to preferred embodiments, workers skilled in the art will recognize that changes may be made in form and detail without departing from the spirit and scope of the invention.

The invention claimed is:

1. A method of operating a wireless mesh network having a plurality of nodes capable of transmitting and receiving messages, the method comprising:

determining a shortest timeslot length to be used by the wireless mesh network based upon minimum time requirements for communication by each node, wherein each timeslot comprises one or more time slot increments each having a time duration $t_i$;

synchronizing the nodes to a communication cycle having a frame, wherein the frame has a time duration $T_f=Nt_i$ based on a refresh rate of the wireless mesh network, where N is a total number of timeslot increments in the frame, N being a positive integer and each timeslot increment $t_i$ being of equal length, wherein the frame forms timeslots each having lengths $Mt_i$; and assigned to the nodes, wherein, for each timeslot individually, M is a positive integer less than N, and wherein a value of M is initially equal for all of the timeslots;

registering a plurality of new nodes with a network manager when the new nodes join the wireless mesh network;

determining a shortest timeslot length of which the new nodes are capable within the wireless mesh network based upon minimum time requirements for communication by each new node to turn on its radio, verify an associated channel is clear, send a message, and listen for an acknowledgement; and assigning timeslots within each frame for communication between pairs of nodes, wherein lengths of the assigned timeslots vary as a function of the shortest timeslot length for each pair of nodes, such that at least one pair of the new nodes both having lower minimum time requirements than other nodes is assigned a correspondingly shorter timeslot;

wherein the network manager assigns the timeslots.

2. The method of claim 1, wherein the frame includes at least one timeslot of a duration of $t_i$.

3. The method of claim 1, wherein the frame includes at least one timeslot of a duration of $2t_i$.

4. The method of claim 1, wherein the frame includes at least one timeslot of a duration of $4t_i$.

5. The method of claim 1, wherein assigning timeslots is based upon stored configuration data for each node.

6. The method of claim 5, wherein the stored configuration data includes a minimum time period required by each node to communicate during a timeslot.

7. A wireless mesh network comprising a plurality of nodes capable of transmitting and receiving messages during assigned timeslots within a repeating communication frame, characterized by:

the plurality of nodes comprising a first set of one or more nodes having first minimum communication time capabilities and a second set of one or more nodes having second minimum communication time capabilities that are faster than the first minimum communication time capabilities, the first and second minimum communication time capabilities being times for each associated node to turn on its radio, verify an associated channel is clear, send a message, and listen for an acknowledgement;

the frame comprising N timeslot increments of equal time duration $t_i$, the time duration $t_i$ selected as a function of both the first and second minimum communication time capabilities, wherein the frame has a total time based on a refresh rate of the wireless mesh network;

each timeslot has a time duration $Mt_i$, where the time duration $Mt_i$ is a positive integer multiple of the time duration $t_i$, and wherein the time duration of each timeslot is independently determined based upon a minimum communication time required by each node assigned to that timeslot to communicate, and wherein the minimum communication time is determined by the first or second minimum communication time capabilities of each node; and a network manager that assigns selected nodes of only the first set to the timeslots and determines the time duration $Mt_i$ of each timeslot, and that reassigns selected nodes of both the first and second sets to the time slots and re-determines the time duration $Mt_i$ of each timeslot.

8. The wireless mesh network of claim 7, wherein the frame includes at least one timeslot having the time duration $Mt_i$ equal to $t_i$.

9. The wireless mesh network of claim 7, wherein the frame includes at least one timeslot having the time duration $Mt_i$ equal to $2t_i$.

10. The wireless mesh network of claim 7, wherein the frame includes at least one timeslot having the time duration $Mt_i$ equal to $4t_i$.

11. The wireless mesh network of claim 7, wherein the frame includes timeslots of different time durations $Mt_i$.

12. The wireless mesh network of claim 1, wherein the network manager uses stored configuration data for the nodes to determine the time durations $Mt_i$ of the timeslots.

13. A wireless mesh network comprising:

a plurality of nodes capable of transmitting and receiving messages, wherein the plurality of nodes comprises a first set of one or more nodes having first minimum communication time capabilities and a second set of one or more nodes having second minimum communication time capabilities faster than the first minimum communication time capabilities, the first and second minimum communication time capabilities being times for each associated node between turning on its radio and listening for an acknowledgement of a sent message; and a network manager for synchronizing the nodes based upon a communication cycle of repeating frames having total frame times based on a refresh rate of the wireless mesh network, wherein each frame includes timeslots assigned to selected nodes, wherein each frame comprises N timeslot increments of equal time duration $t_i$, N being a positive integer, and wherein each timeslot has a time duration $Mt_i$, determined individually, where the time duration $Mt_i$ is a positive integer multiple of the time duration $t_i$ and wherein the network manager assigns timeslots of different time durations depending on the first minimum communication time capabilities of selected nodes of only the first set, and wherein the network manager then reassigns timeslots of different time durations depending on both the first and second minimum communication time capabilities of selected nodes of both the first and second sets, wherein the network manager determines the time duration of each timeslot based upon a minimum time required by the selected nodes to communicate during that timeslot.

14. The wireless mesh network of claim 13, wherein the network manager determines the time duration of each timeslot based upon the minimum time required by the selected nodes to communicate during that timeslot.

15. The wireless mesh network of claim 13, wherein the frame includes at least one timeslot having the time duration $Mt_i$ equal to $2t_i$.

16. The wireless mesh network of claim 13, wherein the frame includes at least one timeslot having the time duration $Mt_i$ equal to $4t_i$.

* * * * *

UNITED STATES PATENT AND TRADEMARK OFFICE
CERTIFICATE OF CORRECTION

PATENT NO. : 8,005,020 B2
APPLICATION NO. : 11/906163
DATED : August 23, 2011
INVENTOR(S) : Robert J. Karschnia Page 1 of 1

It is certified that error appears in the above-identified patent and that said Letters Patent is hereby corrected as shown below:

In column 5, line 7, in Claim 1, delete "$Mt_i$," and insert -- $Mt_i$ --, therefor.

In column 6, line 14, in Claim 9, delete "$2_i$." and insert -- $2t_i$. --, therefor.

In column 6, line 43, in Claim 13, delete "$t_i$" and insert -- $t_i$, --, therefor.

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

PATENT NO. : 8,005,020 B2
APPLICATION NO. : 11/906163
DATED : August 23, 2011
INVENTOR(S) : Robert J. Karschnia It is certified that error appears in the above-identified patent and that said Letters Patent is hereby corrected as shown below:

Col. 6, Line 7, Claim 7
  Delete "time slots"
  Insert --timeslots--

Signed and Sealed this
Twenty-seventh Day of November, 2012

David J. Kappos
*Director of the United States Patent and Trademark Office*